Sept. 16, 1969     G. L. ARMES ET AL     3,467,867
APPARATUS FOR DETERMINING THE OPERABILITY OF
VEHICLE RADIO COMPONENTS
Filed Dec. 8, 1965

INVENTORS
Gerald Lee Armes
BY & James Leslie Gregg

Robert E. Fowler
ATTORNEY 3,467,867
APPARATUS FOR DETERMINING THE OPERABILITY OF VEHICLE RADIO COMPONENTS
Gerald Lee Armes, Kokomo, and James Leslie Gregg, Russiaville, Ind., assignors to General Motors Corporation, Detroit, Mich., a corporation of Delaware
Filed Dec. 8, 1965, Ser. No. 512,349
Int. Cl. H04b 1/16
U.S. Cl. 325—363                2 Claims

ABSTRACT OF THE DISCLOSURE

A portable device for testing the antenna, lead-in and speaker of an automotive radio receiver without removing the same from its normal position in the car. The device contains a battery, a meter, an auxiliary speaker and means to select separate test circuit to apply DC and AC current to an antenna and lead cable as well as to calibrate the meter by applying AC current to it in combination with a reactive circuit representing antenna and cable loss.

State of the prior art

The effectiveness of the antenna is dependent upon leakage to ground or Q of the antenna. The lead-in should be checked for continuity and the speaker for operativeness.

While ohmmeters and continuity testers per se are old, applicants are not aware of any prior art showing such a combination tester to check all of these factors of an automobile ratio receiver in location without removing the same.

Description of the invention

The automobile radio tester of our invention is illustrated in the accompanying drawings in which.

Figure 1:
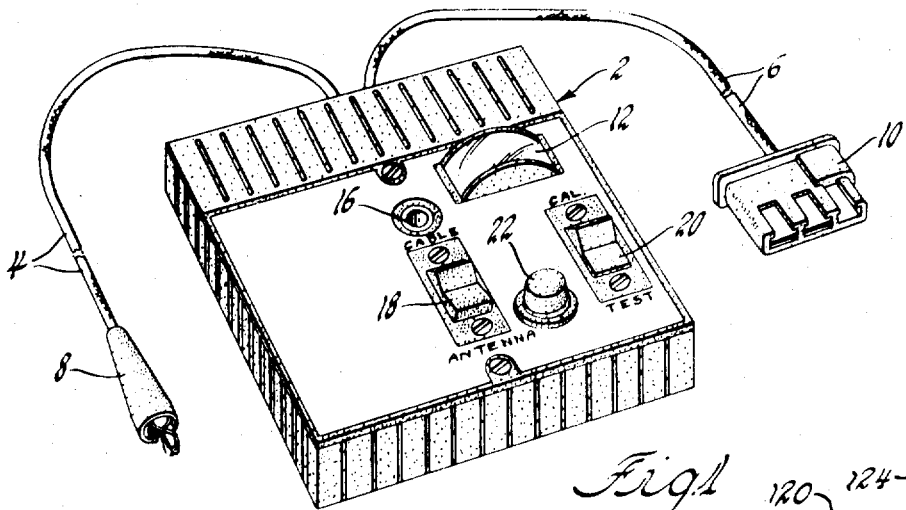
FIG. 1 is a perspective view of the tester with the necessary leads.
Figure 2:
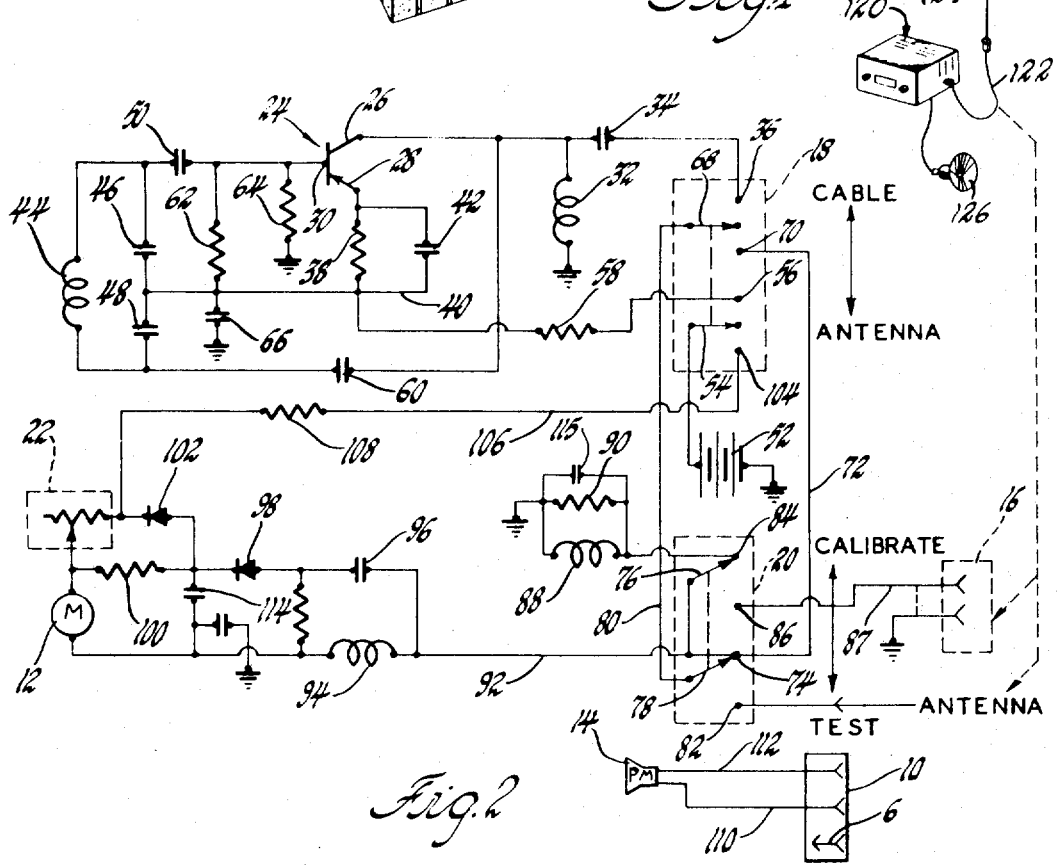
FIG. 2 is a circuit diagram of the circuit used in said tester.

Referring now to FIG. 1, the tester consists of a casing 2 which houses all the components of the system, is light and portable and can easily be placed on the floor board of the front seat of a car and connected to a set mounted in the instrument panel for test. The unit is self powered and has its own battery. It is also provided with two leads 4 and 6 which are connected to a receiver and antenna being tested in a manner to be described. Lead 4 has a clip connector 8 on its outer end and lead 6 is provided with a multi-contact connector 10, one contact of which is connected to lead 6, the others merely acting as electrical couplings in a manner to be described. The tester has a meter 12 for indicating the condition that is being checked when testing the antenna and the lead-in. It has no function in the testing of the speaker. A test speaker 14 is mounted in the casing 2 and is shown in FIG. 2. A plug-in jack 16 is mounted in the cover of the casing which also acts as a support for two control switches 18 and 20. A rheostat 22 completes the components mounted on the cover for control or viewing.

Circuitwise the system includes an oscillator section having a transistor 24 including a collector 26, emitter 28, and base 30. The collector is connected through coil 32 to ground and through a coupling condenser 34 to stationary contact 36 on switch 18. The emitter 28 is connected through a resistor 38 to conductor 40. A condenser 42 is connected in shunt to the resistor 38. The oscillator drive is of the Colpitts type having a tank circuit including inductance coil 44 which has a pair of condensers 46 and 48 in series thereacross connected through a coupling condenser 50 into the base 30. The oscillator is powered from the local battery 52, one terminal of which is grounded and the other terminal connected to movable switch arm 54 of switch 18 which in one position is adapted to engage stationary contact 56. Contact 56 is connected through resistor 58 to line 40 to provide the power for the oscillator. Feedback condenser 60 is connected between collector 26 and the tank circuit 44–46–48. A voltage divider consisting of resistances 62 and 64 connected in series between line 40 and ground provides the proper bias for the emitter and base electrodes. A bypass condenser 66 is connected between line 40 and ground. Thus with the switch 18 in the upper position the oscillator is provided with power and will produce the desired frequency.

The switch 18 is that provided for selecting between testing the cable or the antenna and when it is in its uppermost position the cable is tested and when in its lowermost position the antenna is tested. The switch is a spring switch and normally remains in off or center position. It must be held in either actuated position to remain closed.

The upper movable contact 68 of the switch 18 moves between stationary contact 36 and stationary contact 70. Stationary contact 70 is connected through a jumper connection 72 to a stationary contact 74 on switch 20. Switch 20 is the switch which is used to place the equipment in either calibrate or test condition. When it is moved upwardly as shown in the circuit diagram it is in calibrate position, and when it is moved to its lower position it is in its testt position. This is a snap-over switch and will remain in the position to which it has last been moved. There are two movable contacts 76 and 78 in switch 20 and they are ganged to move together. Movable switch arm 78 is connected through a jumper connection 80 to movable arm 68 in switch 18. This movable contact 78 engages either stationary contact 74 previously described or stationary contact 82. Movable contact 76 of switch 20 engages either stationary contact 84 in its upper position, or stationary contact 86 in its lower position. Contact 86 is connected through conductor 87 to one side of the jack 16, the other terminal of which is grounded. Stationary contact 84 is connected through an induction coil 88 shunted by resistance 90 to ground. Both movable switch arm 76 and stationary contact 74 are connected through a common line 92 to a choke coil 94 and thence to one terminal of the test meter 12. A condenser 96 in shunt to coil 94 has its remaining terminal connected through a rectifier 98 and resistance 100 to the opposite side of the meter 12. The rheostat 22 is connected in series with a diode 102 in shunt to the resistance 100. To apply power to the meter, one side of the battery source 52, which is connected to the movable switch arm 54, engages the stationary contact 104 on said switch 18 and the contact is connected through line 106 and resistor 108 to one terminal of the rheostat 22. The terminal plug 10, which is connected to the lead 6, is also connected through two lines 110 and 112 to the speaker 14 to apply a signal thereto.

In using this tester the operator follows the following procedure. The casing 2 is placed in proximity to the car radio 120 to be tested and the antenna cable 122 extending from the antenna 124 to the radio receiver 120 is pulled out of the set and inserted in the jack 16. The clip 8 on lead 4 is then connected to the antenna mast 124 and this lead is provided of sufficient length so that it will extend to the antenna. With these two connections made, the apparatus is now in condition to test either the antenna of the lead-in. The switch 18 is determinative of which of the two devices will be tested. Assuming that it is desired to first test the antenna, switch 18 is depressed forwardly in FIG. 1 or downwardly as shown in FIG. 2. This switch is a center spring biased switch and must be held in operated position or it will return to inoperative position. The operator, therefore, holds it in the above identified position. He then actuates switch 20 first to the calibrate position to properly calibrate the meter and to check the battery then moving to the test position to obtain an indication of the condition of the system. This is a snap switch and remains in the position to which it was last actuated.

Assuming that switch 20 is actuated to the calibrating position, or upper position, the following energizing circuit will be completed to the meter for calibrating the same and to ascertain that the battery has sufficient power, (at this stage the oscillator section is not used) from battery 52 through switch arm 54, stationary contact 104, line 106, resistor 108 through rheostat 22, meter 12, choke 94, switch arm 76, stationary contact 84, the parallel circuit of coil 88 and resistance 90 to ground. At this point the meter should read at a location marked "Set." If not, the rheostat 22 is adjusted until this point is reached. The system is now calibrated for testing the antenna. With the switch 18 still retained in "Antenna" position, the switch 20 is snapped over to the opposite position or "Test" position. The object of this portion is to determine whether the antenna is sufficiently insulated from the body or is grounded or has a low resistance path thereto. Since the antenna is connected directly to the test clip, which in turn is connected to stationary contact 82 of switch 20, the circuit for testing as to whether this system is grounded or not is from the antenna through contact 82, movable switch arm 78, line 80, switch arm 68, stationary contact 70, line 72, line 92, coil 94 through meter 12, rheostat 22, resistance 108, line 106, stationary contact 104, switch arm 54, battery 52. If the antenna has an infinite or very high resistance to ground the meter will not move or will not move beyond a predetermined point on its face indicating a satisfactory condition. If it has less than a high resistance path to ground the meter will register the amount of resistance to ground by indicating the antenna is poor or unsatisfactory.

To test for cable continuity, the oscillator section is utilized. Switch 18 is held in its opposite or upper position as shown in FIG. 2. The switch 20 is first moved to its calibrate position. With these two switches in the position described an energizing circuit is completed to the oscillator as follows: from battery 52 through switch arm 54, stationary contact 56, resistance 58, resistance 38, emitter 28, collector 26 and through coil 32 to ground. This together with the potential applied to the voltage divider consisting of resistances 62 and 64 applies the proper bias to the oscillator and it is energized to produce a high frequency output. At the same time the output of the oscillator is fed through condenser 34 to contact 36, movable switch arm 68, line 80, movable switch arm 78, stationary contact 74, line 92. From this point there are actually two circuit paths which will be described. One inserts a predetermined impedance path to ground that simulates the cable to ground loss in both the lead-in and test cable and the alternate path inserts the meter directly to the oscillator output. After the meter is calibrated, the lead-in is switched in series with the oscillator and the meter and thus read. The first path to be described is the known impedance path to ground. This is from line 92, movable switch arm 76, contact 84, the parallel paths through resistance 90 and capacitance 115 to ground. Inductance 88 offers no path to ground at the oscillator frequency. The second path in the line to the meter is from line 92 through condenser 96 to rectifier 98 where the high frequency AC is converted into a direct current to charge condenser 114. The charge on condenser 114 is directly across the meter 12 which reads that amount. Again, if the meter does not read at a proper value or "Set," rheostat 22 is adjusted until it does. At that time switch 20 is turned to the opposite position or "Test" position. This switches out the predetermined path to ground circuit consisting of resistance 90 and capacitance 115 and inserts the lead-in cable which appears between line 87 on jack 16 and the clip attached to the base of the antenna and connected to stationary switch point 82. The reading on the meter 12 will show the continuity and loss of the cable under test and indicate "good" or "bad."

After the antenna and the cable lead-in have been tested, the operator can now test the speaker 126 of the receiver if he has not to this point located any difficulty. This is done by substituting a speaker mounted in the case 2 for that of the receiver. With the radio receiver turned off, remove the three-way connector on the back of the set and replace with the connector plug 10. The 12 volt lead from the radio connector is inserted into the test connector thus restoring power to the radio. The radio is then turned on and through the connections described the speaker in the test set is now substituted for that in the radio which is de-energized. If the speaker now produces proper sound it is evidence that the one in the set is unsatisfactory and should be replaced.

Through the use of the radio receiver tester of this invention, many of the components in which many service difficulties arise in radio receivers can be quickly checked without removing the receiver from the vehicle. This will save a great deal of time and servicing in innumerable instances of the unnecessary removal of receivers when in fact the difficulty lay in the separate speaker or in the antenna or the lead-in.

What is claimed is:

1. A portable apparatus for locating equipment failures in vehicle radio receiver systems of the type having an antenna, a receiver, a speaker and an antenna lead cable comprising:

a casing having disposed therein an auxiliary speaker, a battery, an oscillator, a current-reading meter, a reactive circuit, and first and second double throw switches, first test circuit means including the first and second switches for connecting an antenna and cable in series with the meter and the battery to determine the DC resistance of the antenna as a function of current therethrough, second test circuit means including the first and second switches for connecting the battery to the oscillator and the oscillator to the parallel combination of the meter and the reactive circuit simulating antenna and cable impedance to calibrate the meter, third test circuit means including the first and second switches for disconnecting the reactive circuit and connecting the oscillator to the series combination of the antenna, cable and meter to determine the AC loss of the antenna cable, and fourth test circuit means including the auxiliary speaker for connecting the receiver to the auxiliary speaker instead of the receiver system speaker thereby to determine the location of an equipment failure in the receiver system as between the antenna, cable, receiver and speaker.

2. A portable apparatus for locating equipment failures in vehicle radio receiver systems of the type having a separate receive, antenna, antenna lead cable and speaker comprising:

a casing carrying a battery, an oscillator circuit having an input and output, an auxiliary speaker, a reactive circuit, a current-reading meter circuit and first and second independently operable multicontact switches, the apparatus further including first test circuit means for connecting the battery through a first contact of the first switch to the series combination of the meter circuit, a first contact of the second switch and an antenna and lead-cable to determine the DC resistance thereof, second test circuit means for connecting the battery through a second contact of the first switch to the input of the oscillator circuit to energize the same, and the output of the oscillator circuit through a third contact of the first switch, and a second contact of the second switch to the parallel combination of the reactive circuit and the meter circuit to simulate the AC impedance of an antenna and cable thereby to calibrate the meter circuit, and third test circuit means for connecting the output of the oscillator through said third contact of the first switch and a third contact of the second switch through the series combination of an antenna and cable and the meter circuit exclusive of the reactive circuit thereby to test the AC impedance of an antenna and cable, and means to connect the auxiliary speaker to a radio receiver in place of the receiver system speaker to determine the operability of the system speaker.

References Cited

UNITED STATES PATENTS

| | | | |
|---|---|---|---|
| 1,805,094 | 5/1931 | Hoover | 325—363 XR |
| 2,595,518 | 5/1952 | Gassett | 325—363 |
| 2,732,491 | 1/1956 | Jeannot | 325—363 |
| 2,780,775 | 2/1957 | Nielsen | 325—363 XR |

KATHLEEN H. CLAFFY, Primary Examiner

R. S. BELL, Assistant Examiner

U.S. Cl. X.R.

324—51